United States Patent
Xu et al.

(10) Patent No.: US 12,556,784 B2
(45) Date of Patent: Feb. 17, 2026

(54) SYSTEM AND METHODS FOR OBTAINING AUTHORIZED SHORT VIDEO CLIPS FROM STREAMING MEDIA

(71) Applicant: Adeia Guides Inc., San Jose, CA (US)

(72) Inventors: Ning Xu, Irvine, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/216,870

(22) Filed: Jun. 30, 2023

(65) Prior Publication Data

US 2025/0008201 A1 Jan. 2, 2025

(51) Int. Cl.
| | | |
|---|---|---|
| H04N 7/16 | (2011.01) | |
| G10L 15/22 | (2006.01) | |
| H04N 21/488 | (2011.01) | |
| H04N 21/845 | (2011.01) | |

(52) U.S. Cl.
CPC ......... H04N 21/8456 (2013.01); G10L 15/22 (2013.01); H04N 21/4884 (2013.01); *G10L 2015/223* (2013.01)

(58) Field of Classification Search
CPC ............ H04N 21/8456; H04N 21/4884; G10L 15/22; G10L 2015/223
See application file for complete search history.

(56) References Cited

U.S. PATENT DOCUMENTS

| | | | | |
|---|---|---|---|---|
| 8,285,886 B1 * | 10/2012 | Vass | ................. | H04N 21/44004 710/33 |
| 2002/0070958 A1 * | 6/2002 | Yeo | .................... | H04N 21/8549 348/553 |
| 2004/0064497 A1 * | 4/2004 | Debey | ................. | H04N 21/8456 348/E7.071 |
| 2012/0054797 A1 * | 3/2012 | Skog | ................... | H04N 21/4314 725/41 |
| 2012/0099022 A1 * | 4/2012 | Sundy | .................. | H04N 21/812 348/E5.057 |
| 2013/0223813 A1 * | 8/2013 | Kunigita | ............ | H04N 21/4302 386/241 |
| 2015/0271541 A1 * | 9/2015 | Gonder | ............ | H04N 21/64322 725/25 |
| 2017/0025152 A1 * | 1/2017 | Jaime | ................... | H04N 21/854 |

(Continued)

OTHER PUBLICATIONS

"Average daily time spent with video content among adults in the United States from 2019 to 2028, by device", U.S. TV and video consumption 2028 Statista, online available at <https://www.statista.com/statistics/420791/daily-video-content-consumption-usa-device/>, retrieved on Feb. 27, 2025, pp. 1-4.

(Continued)

*Primary Examiner* — Annan Q Shang
(74) *Attorney, Agent, or Firm* — HG LAW LLP

(57) ABSTRACT

Systems and methods are disclosed for providing video clips of displayed content for download or sharing. These systems and methods may generate, upon request, clips of events that are ongoing, have already happened, or will happen in the future. A request may specify a particular event and the systems and methods may locate the relevant clip within the content. The systems and methods may further format the clip for a preferred platform or presentation. A clip, once generated, can be provided to a user device, which can upload the clip to a designated app or platform, e.g., for social media sharing.

20 Claims, 11 Drawing Sheets

(56) References Cited

U.S. PATENT DOCUMENTS

| | | | | |
|---|---|---|---|---|
| 2020/0322647 | A1* | 10/2020 | Zheng | H04N 21/8549 |
| 2023/0096176 | A1* | 3/2023 | Pichaimurthy | H04N 21/2347 725/31 |
| 2023/0138712 | A1* | 5/2023 | Ozawa | H04L 65/60 709/219 |
| 2023/0319346 | A1 | 10/2023 | Panchaksharaiah et al. | |

OTHER PUBLICATIONS

"Hough transform", Wikipedia, Online available at <https:en.wikipedia.org/wiki/Hough_transform>, retrieved on Feb. 27, 2025, pp. 1-10.

"Yarn's App Lets You Share Short Clips From Movies, TV Shows And Music Videos", TechCrunch, Dec. 29, 2015, Online available at <https://techcrunch.com/2015/12/29/yarns-app-lets-you-share-short-clips-from-movies-tv-shows-and-music-videos/>, retrieved on Feb. 27, 2025, pp. 1-11.

Carreira, J. et al., "Quo Vadis, action recognition? A new model and the kinetics dataset", 2017 IEEE Conference on Computer Vision and Pattern Recognition (CVPR), Jul. 21-26, 2017, pp. 6299-6308.

Esposito, F. "Amazon Prime Video now lets users share clips from movies and TV shows on social networks", 9to5mac, Nov. 11, 2021, online available at https://9to5mac.com/2021/11/11/amazon-prime-video-lets-users-share-clips-from-movies-and-tv-shows-on-social-networks/, retrieved on Feb. 27, 2025, pp. 1-7.

Li, A., "YouTube ML turns landscape video ads into Short-friendly vertical ones", 9to5google, Sep. 15, 2022, online available at <https://9to5google.com/2022/09/15/youtube-vertical-video-ads> retrieved on Feb. 27, 2025, pp. 1-6.

Luo, H. et al., "CLIP4Clip: : An empirical study of CLIP for end to end video clip retrieval", arXiv:2104.08860v2, May 8, 2021, 14 Pages.

Portillo-Quintero, J. A. et al., "A straightforward Framework for video retrieval using clip", arXiv:2102.12443v2, Feb. 26, 2021, 10 pages.

Radford, A. et al., "Learning Transferable Visual Models From Natural Language Supervision", Computer Vision and Pattern Recognition, arXiv:2103.00020, Feb. 26, 2021, pp. 1-48.

Ramanishka, V. et al., "Top-Down Visual Saliency Guided by Captions", 2017 IEEE Conference on Computer Vision and Pattern Recognition (CVPR), Nov. 9, 2017, pp. pp. 3135-3144.

Tran, D. et al., "Learning Spatiotemporal Features with 3D Convolutional Networks", arXiv:1412.0767, Oct. 7, 2015, 16 pages.

Wang, L. et al., "Temporal segment networks: Towards good practices for deep action recognition", European Conference on Computer Vision, 2016, pp. 20-36.

Xia, H. et al., "A Survey on Temporal Action Localization", IEEE Access, vol. 8, Apr. 13, 2020, pp. 70477-70487.

Yu, T. et al., "Temporal structure mining for weakly supervised action detection", 2019 IEEE/CVF International Conference on Computer Vision (ICCV), Feb. 27, 2020, pp. 5521-5530.

\* cited by examiner

SYSTEM AND METHODS FOR OBTAINING AUTHORIZED SHORT VIDEO CLIPS FROM STREAMING MEDIA

BACKGROUND

The present disclosure is directed to content storage and delivery systems and, more particularly, to generation and storage of segments of transmitted content to be used in future delivery and/or sharing.

SUMMARY

Disclosed herein are systems and methods to provide video clips of displayed content for download or sharing. These systems and methods may generate clips of events that are ongoing, have already happened, or will happen in the future. A clip, once generated, can be provided to a user device, which can upload the clip to a designated app or platform, e.g., for social media sharing.

In one approach, a device uses a connected or integrated camera to capture content from a display source. The captured content often is lower quality than the original source due to distortion and recording quality. The captured content further can be shaky as many of these videos are made by hand. The captured content often requires editing to meet the requirements of a given platform on which the user device might share the content. For example, many platforms have limits on runtime for shared video. In another example a platform includes a required aspect ratio. These requirements further distort the original content and take time to manage and process. As a result, a user device stores or shares captured content that is time consuming to create with lower quality than the original display.

Further, this approach may only capture and share content that is expected and not yet displayed. If content is not expected, it is unlikely that the user device and camera are in the correct position to capture the content at the time the content occurs. If the content has already been displayed, a user device can only capture the content if it has been recorded and can be replayed for captured. However, not all content is recorded for replay or easily accessible for replay. This situation leaves many videos unable to be recorded and eventually clipped.

To solve these problems, an approach is described herein where the system connects a user device with a display device and a system server to receive high quality captured content. One embodiment comprises storing in a buffer a received portion of a content item comprising a plurality of sequential segments, receiving, via a user interface, a request for a clip of the content item, the request associated with a clip subject, determining, for each segment of the plurality of sequential segments, a representation of the respective segment by CLIP embedding, selecting a subset of the plurality of sequential segments based on the subject of each segment in the subset of the plurality of sequential segments matching the clip subject associated with the request, wherein a number of the subset has a duration no larger than a predetermined time frame, and providing the selected consecutive segments. The received content is of appropriate length and specifications or format for the desired platform. It further may request and receive content already displayed. This approach uses processing which reduces the need for manipulation on the user device, saving time and effort while ensuring a high quality, relevant video.

For example, a television displays a soccer match, a smartphone might request a clip of a goal from the game. The smartphone might receive an instruction, "Clip that goal!" to capture the clip and transmit that request to the disclosed system. The system can analyze the request to determine the subject—the goal which occurred 15 seconds ago—and find the intended clip in buffered video. The profile associated with the smartphone indicates that clips requested may be shared (e.g., uploaded) on TikTok. Once the system finds the intended clip, it may further manipulate the clip without additional input from the smartphone to format the clip for optimal performance and display on TikTok.

In another example, a user device receives an instruction via a gesture to provide a clip of a gymnastics competition. The user device receives the gesture via camera and after processing the captured images, determines the request. It then sends the request to the system which locates and formats a clip matching the intent of the request from buffered content of the competition. The format, for example, might include layout details as well as video specifications (e.g., codec type, bitrate, etc.) and length or duration of the clip. It might also format the clip according to a specific platform requirement. For example, a user profile connected to the user device might indicate that the user device shares clips on TikTok. Accordingly, the system may format the clip for best display on TikTok.

In another embodiment, the system divides the video of an event into a set of segments. The system may compute CLIP embeddings of each frame of a segment to determine its contents. The system then finds an average of the embedding vectors of all the frames to find a subject of the segment. The system then may use the subject to determine whether the segment 610 might be the requested clip using a similarity score. The system may then filter the results with a score threshold and a length threshold. Following the filtering, the segments are de-duplicated to remove any repeating segments. The system might also use an optimization algorithm to find the best grouping of segments.

In some embodiments, the clipping service may recommend or suggest to clip content based on previous clip requests. For example, the service might receive a request to clip content while a user device displays a specific sports team or in response to the occurrence of particular event (e.g., goal in a soccer match, interception in a football match, etc.). In such cases, the clipping service might recommend to clip the content by displaying a prompt to do so. Other options may be enabled including automatic clipping in response to a predefined event(s) such as clips are automatically generated every time a particular player scores a goal, or whenever a physical altercation occurs in a hockey game, etc.

In some embodiments, the system may receive a request that includes specifying the events for automatic clipping in a user profile as part of preferences. The preferences may be saved for different content genres or categories (e.g., sports, action content, etc.). In another embodiment, user preferences may specify auto-clipping at the beginning or during content consumption. For example, the system might display a prompt at the beginning of a show (e.g., game) with an option to clip and post content to a social platform. In response to a selection of the prompt, the system might present a list of clip criteria to select based on the genre or category of the show. For example, the clipping service might present a list specific to events that would occur in a soccer game (e.g., Clip Penalties) or a football game (e.g., Clip missed field goals, Clip Touchdowns, etc.). User preferences might also specify to only clip content during a portion of the show (e.g., game) such as during the fourth period of a football match.

Clipping settings may be carried over to other related shows. For example, settings configured for a favorite football team might apply to all the games where the favorite team is competing. Similarly, the clipping application might present a "Series clipping" option to allow for one time configuration of the settings for all related content (e.g., content belonging to the same TV series, actor appearing in various content items such as movies and commercials, etc.).

DETAILED DESCRIPTION

The present disclosure is directed to systems and methods for producing clip segments of video or other content. The clip may contain a portion of the content specified in a clip request. It may further include conditions required or appropriate for storing or sharing on a specific application or platform. The systems and methods may generate and transmit the clip upon the request without further manipulation from the requesting device.

Figure 1A:
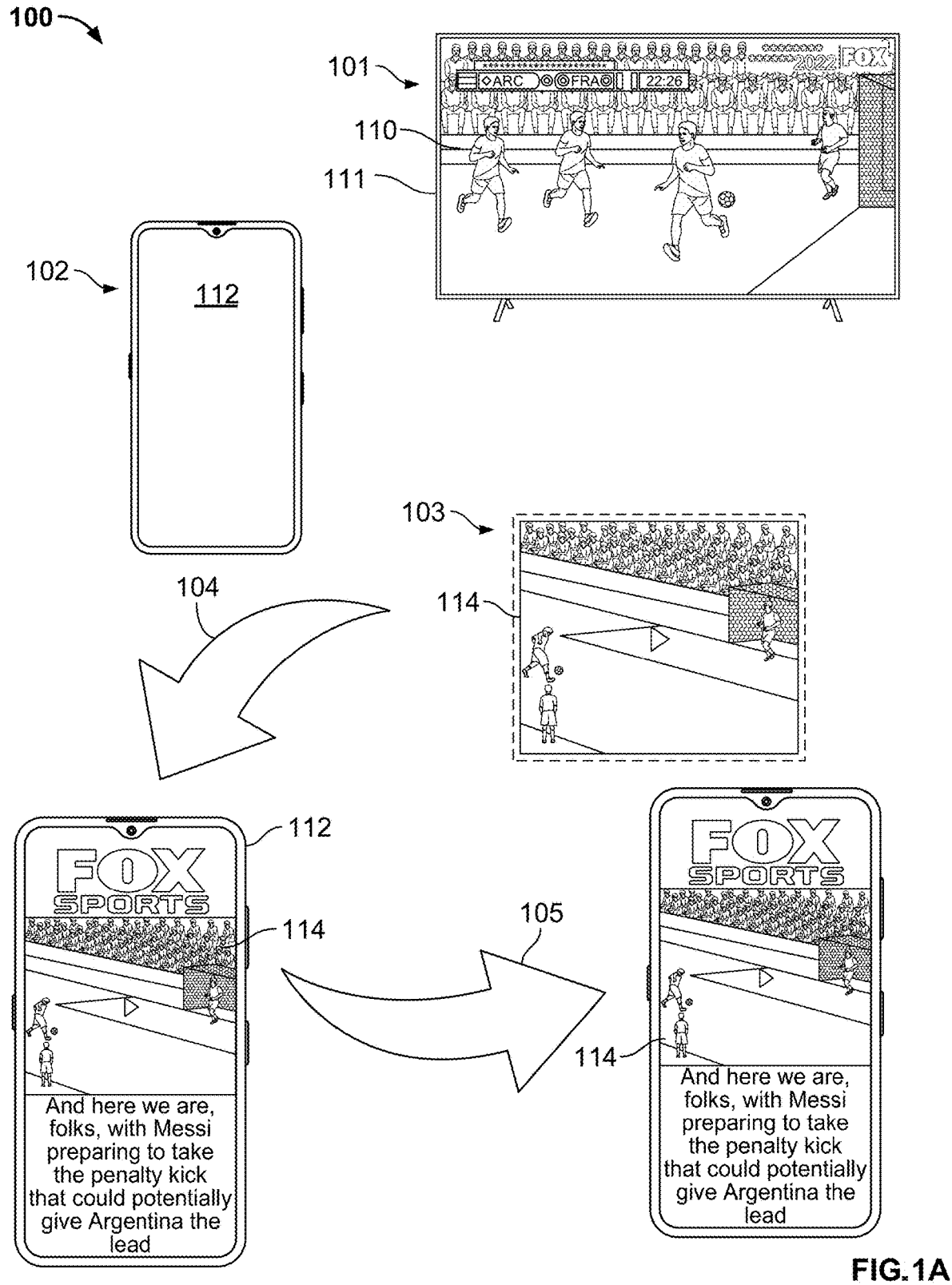
FIG. 1A shows an example embodiment of the present disclosure.

FIG. 1A shows an example embodiment of the clip retrieving system 100. At step 101 a user viewing device 111 displays an event or content item 110. The content may be a live event such as a sporting event or a broadcasted contest, for example. It may alternatively be a recorded program or any other content including audio-only content such as songs or commentary, advertisements or commercials, etc., A user control device 112 requests a clip 114 of the event 110 in response at step 102. The clip may be for example a portion of the event or content 110. The portion may be a highlighted event such as a goal or performance. It may in one embodiment be an introduction or closing segment as well or any other segment deemed important or interesting. The clip 114 may be a variety of lengths of time, although in some embodiments the clip 114 is relatively short, under a minute, for example. The clip 114 may contain audio or visual content or both. The clip request may include a subject of the clip, for example, a specific goal or performance. In some embodiments the request is via a dedicated app, and a control device 112 is a smartphone with the dedicated app downloaded. In some embodiments, the request specifies a sharing platform for the clip 114. The sharing platform may be for example a social media platform. The system 100 receives the request and creates a clip 114 of event 110, the clip 114 meeting any details specified in the request such as the subject and any conditions required by the designated platform at step 103. The conditions might for example include a time limit, layout, aspect ratio, frame rate, or any other setting or condition that might be desirable or necessary. The system 100 then sends the created clip 114 to user control device 112 at step 104. In an embodiment, the video resolution of clip 114 can be different or altered compared to content 110. The resolution can be either higher or lower. Similarly, other aspects of the video 110 representation could be different as well for example, frame rate, color space, bit depth, coding format, etc. User control device 112 may then download and/or share the clip 114 using the sharing platform or other application or means at step 105. For example, the control device 112 might download the clip 114 to a favorites folder in a photos app or it might upload the clip 114 to a social media account. User control device 112 might additionally caption the clip 114, add a filter and animation, or any combination thereof and a post it on a social media platform.

Figure 1B:
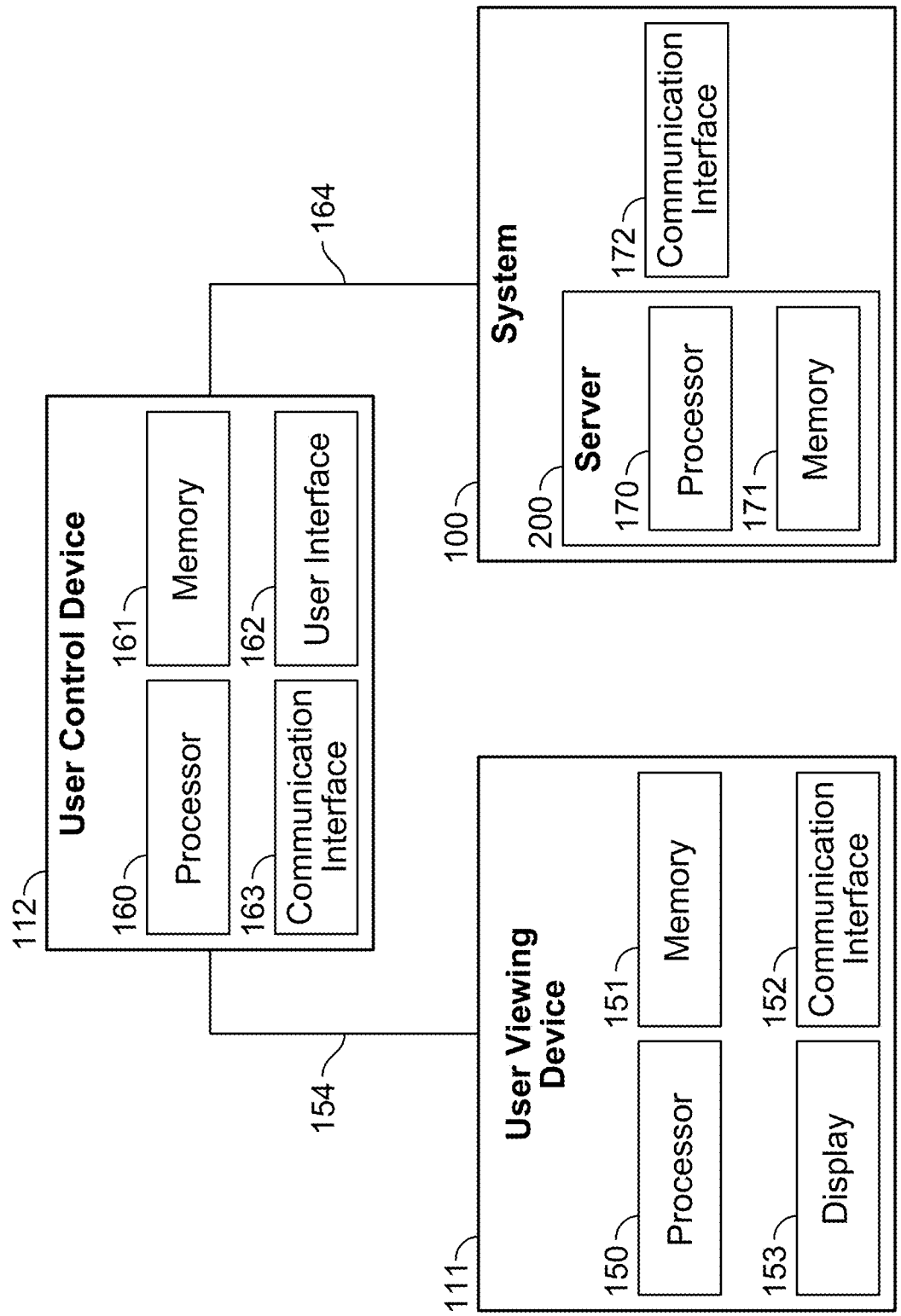
FIG. 1B shows an example environment of the present disclosure.

FIG. 1B shows an example environment of system 100. The environment includes user viewing device 111 which displays original content 110. In some embodiments user display device 111 is for example a television. In one embodiment the user display device 111 is for example a smart phone. User display device 111 includes a processor 150 and memory 151. It further includes communication interface 152 for receiving commands and display screen 153 for outputting content display. User display device 111 is connected to user control device 112 via a communication link 154, which may be a Wi-Fi connection, Bluetooth connection, or any suitable communication link. User control device 112 may be for example a smartphone or any other device capable of transmitting a request for a clip 114. The user display device 111 and user control device 112 may in some embodiments be the same device for example in the case where both are a smartphone or where a television is connected to system 100 and receives requests for clips 114. User control device 112 includes a processor 160 and memory 161. It further includes user interface 162 and communication interface 163. In some embodiments user control device 112 includes a smartphone application designated for system 100. User control device 112 is connected to system 100 via a communication link 164 which may also be a Wi-Fi connection, Bluetooth connection, or any suitable communication link. System 100 includes server 200 which includes processor 170 and memory 171. System 100 further includes communication interface 172.

Figure 2:
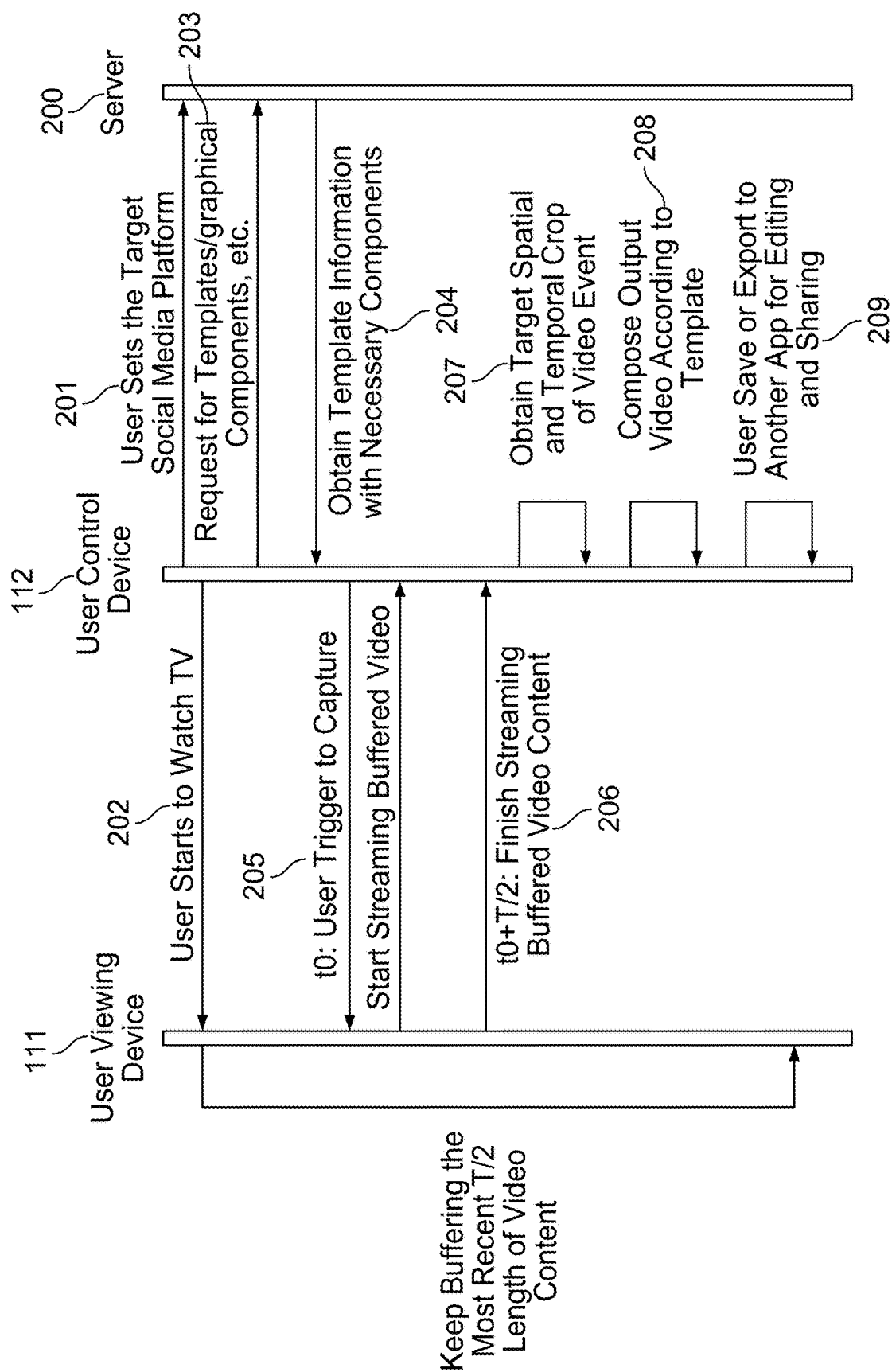
FIG. 2 shows an example process of the present disclosure.

FIG. 2 shows the interactions between a server 200 of system 100, the user control device 112 and the user viewing device 111 during an example embodiment of the disclosure. First, the user viewing device 111 will access a video buffer that can buffer a certain amount of time (T) of video content of an event or content 110 that is shown on the screen. For example, viewing device 111 starts to buffer content when it joins a video stream (e.g., live channel or an on-demand content item). In one embodiment, the user control device 112 might send a command to trigger the buffering process at time to, and the viewing device 111 will continue buffering another T/2 amount of time, i.e., the viewing device 111 will send a video clip with length T and centered at t0 to the control device 112. In one embodiment, the viewing device 111 could start to send the content 110 immediately and stop sending when the entire T length of content is delivered to the control device 112. The system 100 might consider the size of uncompressed video data in enacting buffering or recording of content 110. For example, uncompressed data might be very large, for example, a raw HD video (1080p) with 30 frames per second (fps) will need 150 MB of storage space per second, which means 9 GB for one minute. However, using a compression format like H.264 or HEVC, the system 100 can reduce the file size significantly. A video with H.264 codec at 6 Mbps bitrate will need 45 MB for 1 minute. Therefore, in one embodiment the device 111 buffers compressed video streams instead of the raw frames so that it uses less storage on the device 111 and less time to transmit data to the user control device 112. In one embodiment an app running on the user control device 112 will communicate bi-directionally with the user viewing device 111, including the remote control of device 111. The control device 112 can connect to the viewing device 111 with either Bluetooth or Wi-Fi or any other suitable connection means. The user control device 112 can designate the target platform for the output video 114, for example, the platform could be any social network apps, or the platform could be a device's photo app for saving the clip 114 to a stored photo album.

At step 201 the user control device 112 may set a designated platform for sharing or storing clip 114 and send that information to server 200. The target platform information can be sent to the server 200, which in some embodiments will be able to determine the appropriate output template to use for the clip 114 for optimal display on the platform.

At step 202 the event 110 begins on user viewing device 111. In some embodiments the event begins earlier or later relative to the other steps. For example, the user control device may not set a platform until halfway through the event 110. In another embodiment, the event 110 may begin after the user control device 112 has received template information or has requested a clip 114.

At step 203 user control device 112 sends a request for templates, graphical components, or similar to server 200. At step 204 the server 200 sends to the user control device 112 template information. In some embodiments the system 100 will send the template information as well as those elements needed for the template to the control device 112. The template might include information such as video format, for example, frame rate, resolution, compression parameters, etc. It might also include video temporal layout, for example, an indication that the clip 114 will be 20 second of original video+3 seconds of a closing clip of additional content, or 2 seconds opening clip+10 second of original video. It might also include spatial layout of the output video, for example, specify the aspect ratio of the original video 110 and portions for other or additional content. The template might also include any video/image elements that could be used to compose the final output video clip 114, including the opening/closing clip, logos, etc.

At 205 user control device 112 sends a request for clip 114 and buffering of the event 110 begins. In one embodiment, a DVR can serve as the video buffer. At step 206 the buffering ends. Once the control device 112 receives the content from the viewing device 111, in one embodiment, the control device 112 will decode the video stream and using system 100 determine the intention or subject of the request and segment out a target video clip with a length that is less than or equal to the target video length limit specified by the template or other source. For example, the length could be 10 seconds. In one embodiment, the system 100 can automatically find out the starting and ending frame, as well as the cropping box for each frame as is described in detail below. In one embodiment a server 200 may contain the video content and can directly send the clip 114 to the control device 112. In one embodiment clip 114 can be generated on a server 200 and sent to device 112 and/or posted directly to the preferred platform. In one embodiment highly demanded video events can be generated and be sent to the user control device 112 based on which time the request triggers the capture. For example, if a request indicates "the winning goal" the system 100 might recognize the winning goal as a popular request and determine its location in content 110, for example at time 31:00 to 31:33. The system 100 may then simply extract content associated with that time frame from a cloud server 200 for processing and upload.

Figure 8:
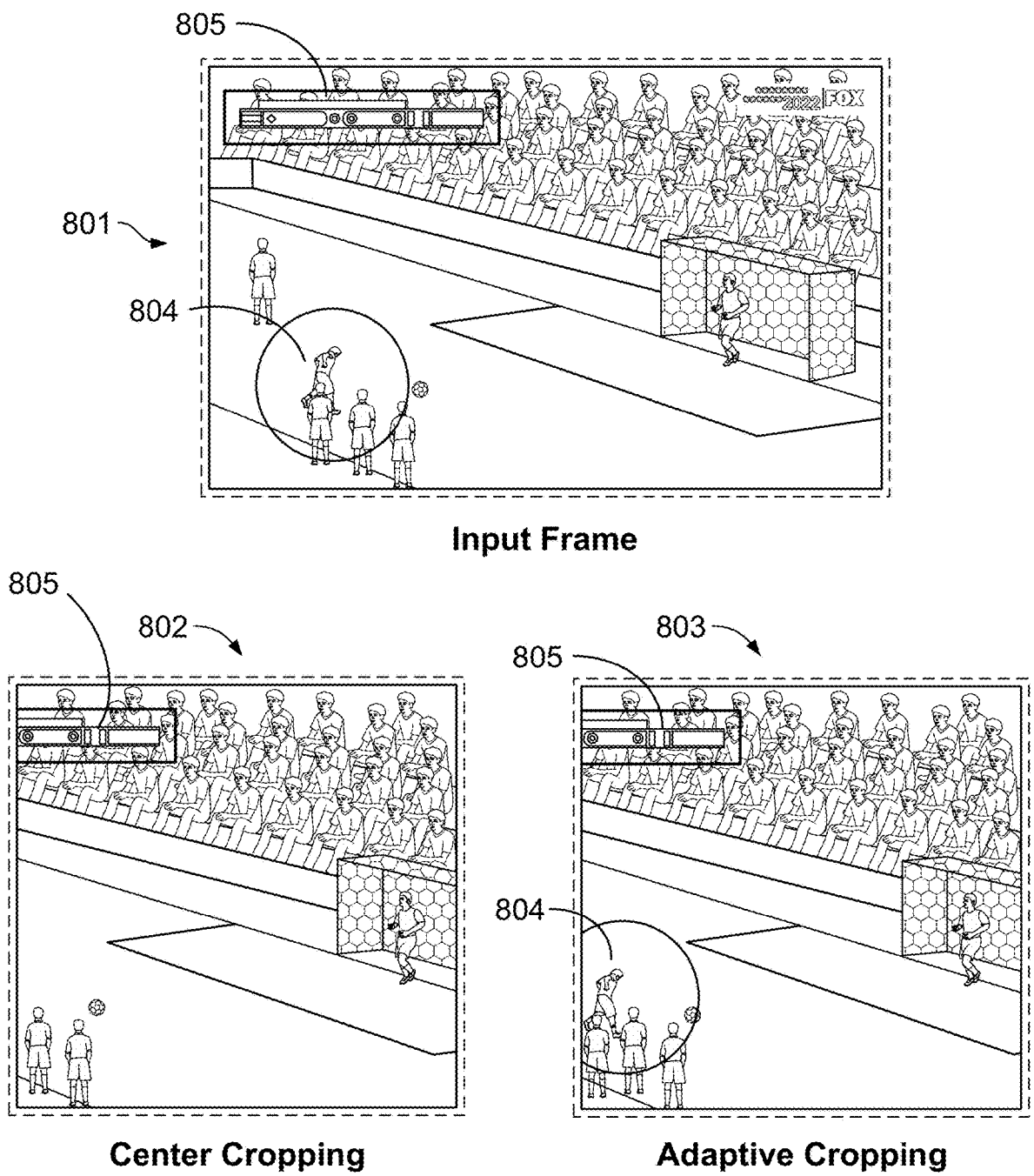
FIG. 8 shows example clip cropping of the present disclosure.

The system 100 at step 207 obtains and sends a spatial and temporal crop of event 110. In one embodiment the video processing including temporal and spatial composing may be carried out on the server 200, and the user control device 112 may receive the clip 114 for saving and sharing. In some sever-based embodiments, a video event generated for one user device 112 could be saved for another user device 112 as well. Regarding spatial cropping, one of the most common problems is that the channel logos and/or the scoreboard in the original video content 110 may be fully or partially cropped. An example of this issue is shown in FIG. 8 and described below. In order to avoid that issue, a video-based object removal algorithm may run first to remove the logos and score board. Since the channel and the logo and scoreboard location, if any, are known, an embodiment may apply off-the-shelf object-removing algorithms using an object bounding box. At step 208 the system 100 uses the crop to compose an output video conforming to the requirements of the platform, creating clip 114. The system sends this clip 114 to the user control device 112 which saves or shares the clip at step 209. In this embodiment, most of the computation is done on user control device 112. In one embodiment, the computation can also be carried out on the user viewing device 111 or on the server 200.

In one embodiment a user control device 112 may trigger capturing an event that has already passed on the television or other user viewing device 111. A television 111 displays a live broadcasting of Argentina's soccer game in the world cup. When a player, for example, Messi scores a goal, a fan, Bob may feel ecstatic and wants to share the exciting moment with his friends on Snapchat. An application on a smartphone, or user control device 112, activates a service, system 100, that may automatically obtain a short video of the goal event. The smartphone 112 sends a request for the video to the system 100. The system 100 receives an indication that the platform for display of the short video, or clip 114, is Snapchat. The system 100 provides an authorized video clip 114 in vertical format and within the required time length limitation-such as less than 10 seconds—that can be shared directly through Snapchat.

Figure 3:
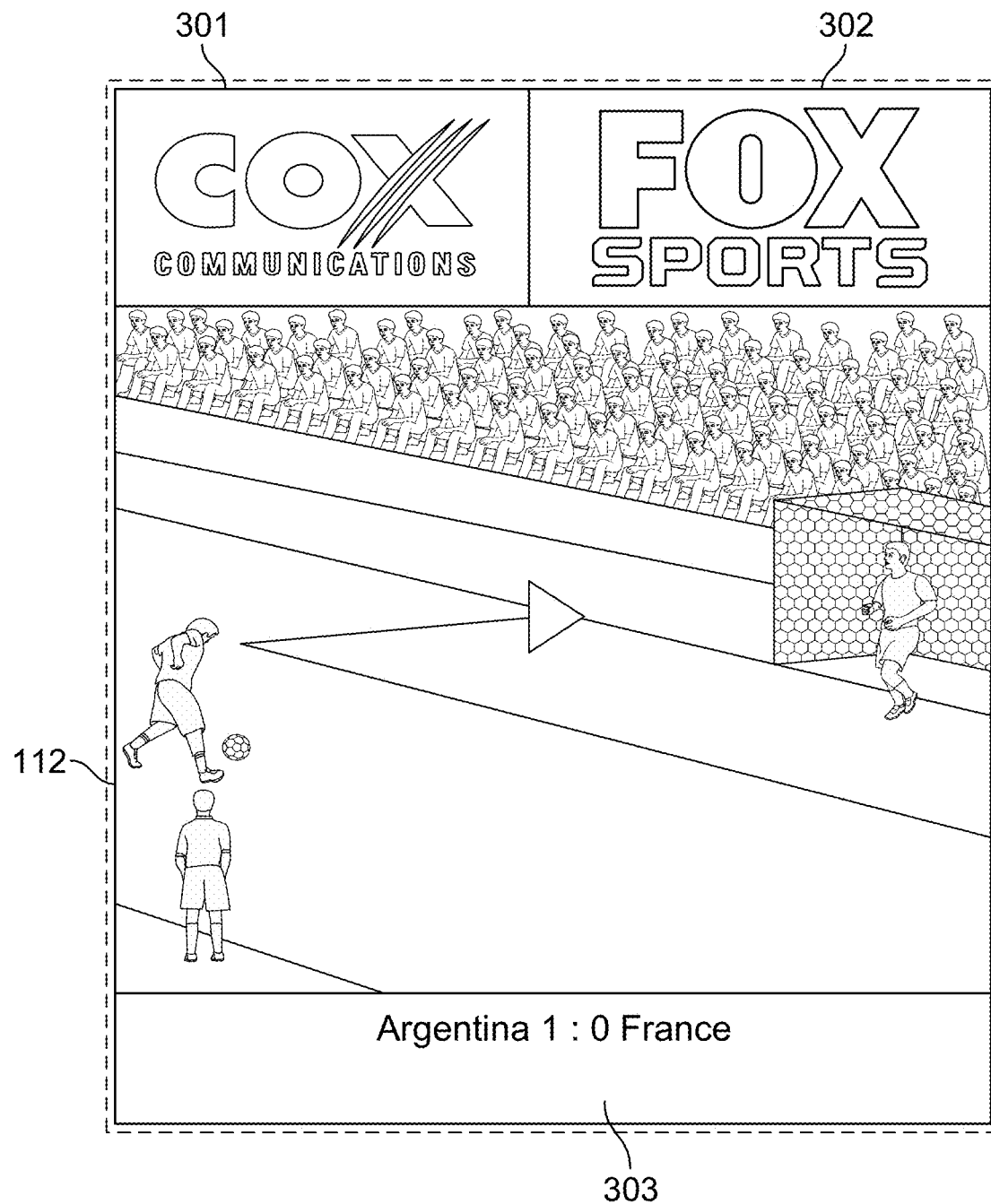
FIG. 3 shows an example clip of the present disclosure.
Figure 4:
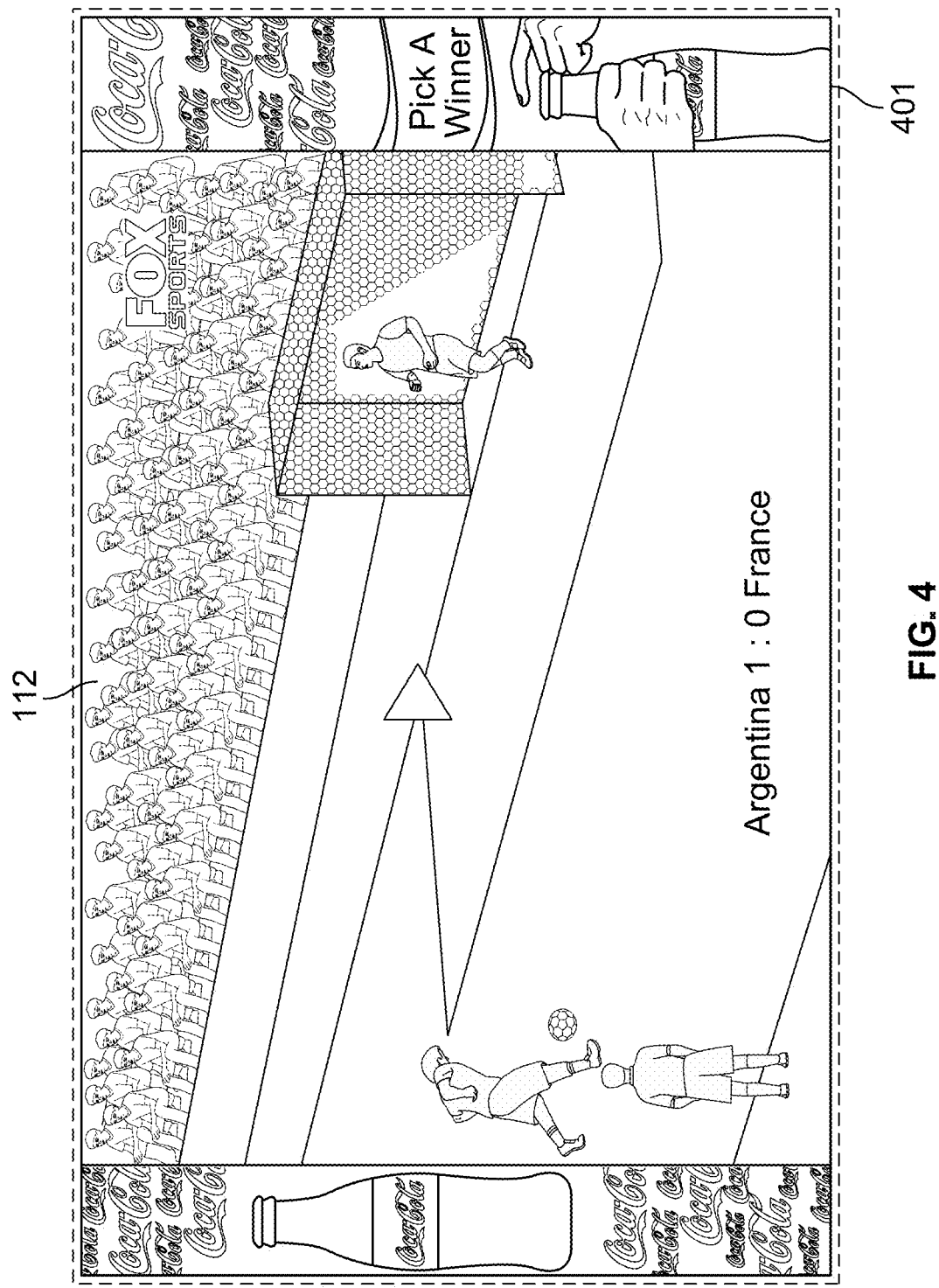
FIG. 4 shows another example clip of the present disclosure.

In one embodiment a content provider provides templates for sharing content. The service provider could choose to integrate the functionality into one or more certain social media platforms as well. For example, Fox Sports may have obtained the license to broadcast the World Cup in the United States. As part of the license coverage, Fox Sports may be able to allow viewers to obtain short clips from the broadcast, for example, viewers may obtain up to 5 clips per hour, with each clip being less than 30 seconds long. Fox Sports may design several different templates for different target platforms. In each of the templates, there may be some real estate in the output video clip 114 to display additional content. This real estate in the output clip 114 could be some spatial portions of the output, spatial overlays, or additional temporal frames before, after, or in the middle of the clip 114. For example, in a vertical format output, the top portion of the image frame can show additional content. Additional content examples are shown in FIG. 3. In that FIG., the service provider 301, related to Cox Communications, and content provider, or network or original content source, information 302, related to Fox Sports, is displayed above the clip 114. The system 100 displays the score of the game 303 below, which will show before clip 114. Different portions of the video content can also be sold or bid for third party use. An example of third party additional content is shown in FIG. 4. FIG. 4 illustrates banners 401 displayed aside the clip 114 where the banners offer further real estate for additional content, which may be third party or other content. In one embodiment a clip request itself may trigger a request for inclusion of third party content. The system 100 may interface with a network that provides or manages additional or third party content. In one embodiment the system 100 receives content related to a winning bid from this network. In one embodiment the bid includes a format such as a logo as seen in FIG. 4 or a pre-roll video that plays prior to playing the clip 114. The system 100 may integrate the content in these formats into a file containing clip 114. Other integration methods are contemplated, such as inserting links to the additional content in the manifest file associated with clip 114. Additional formats are supported and that includes midroll and post-roll content.

Figure 5:
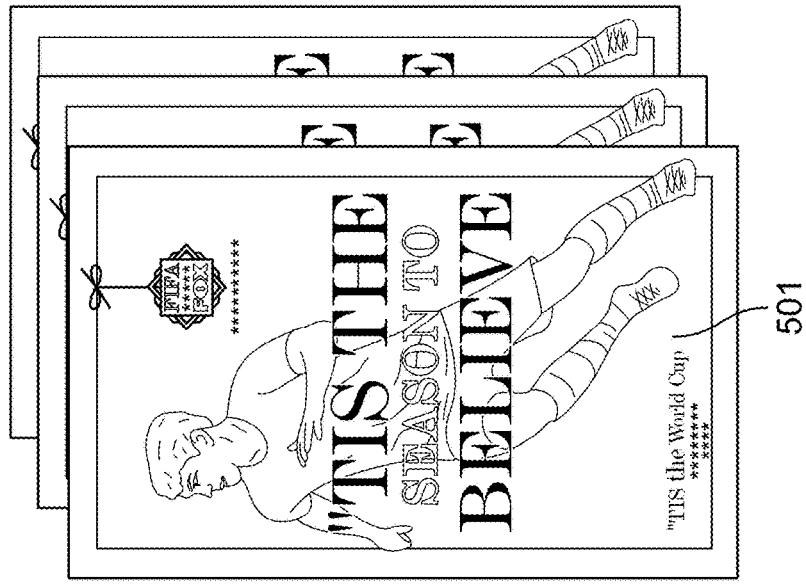
FIG. 5 shows another example clip of the present disclosure.
Figure 5:
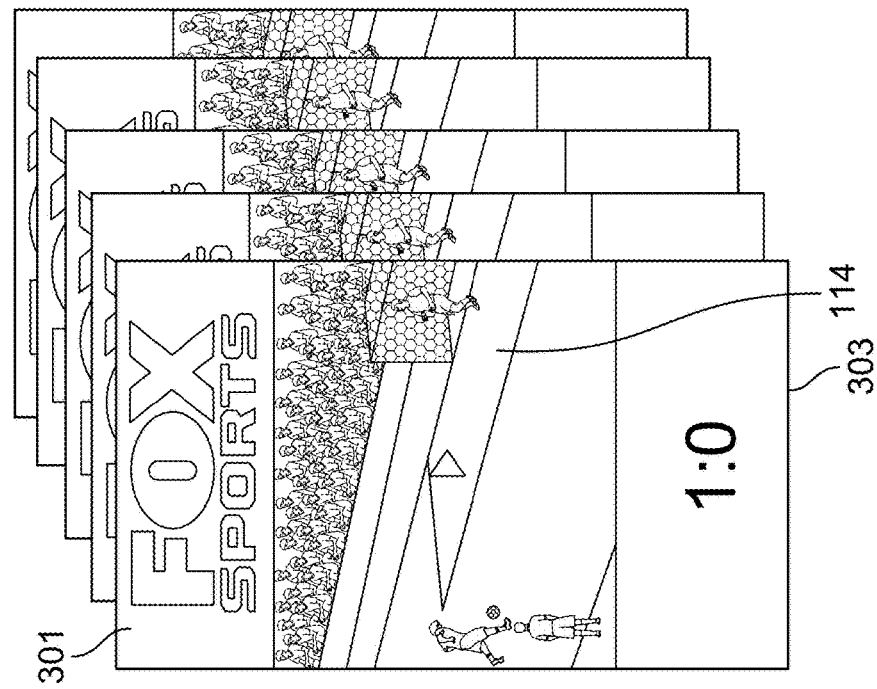

In some embodiments, a format may include a short clip of static images or video at the beginning or at the end of each output clip 114, such as an opening or closing logo or a pre-roll additional content (e.g., audio/video messages from a sponsor, advertisement, etc.). FIG. 5 illustrates a closing image 501 which the system 100 displays immediately after clip 114. The embodiment in FIG. 5 further shows score 303 and network information 302. In one embodiment, the service provider will have multiple different templates for the content and the system 100 will automatically choose one template based on a profile, or present several templates for selection. The previously chosen templates may update a user profile which can store the template for future use or reference. Any other appropriate information can also be added to the video, for example, the scoreboard, or subtitles. The different formats of the additional content that is integrated with the clipped content can vary as well—it can be an image of a product, a sticker, a filter, a logo, a link, a content promotion, etc. This is known as a supplemental asset. Fox Sports in the example embodiment or other content providers can charge a fee for this feature or can make it a free feature to encourage collaboration. When the system 100 publishes the clipped video 114 on social media, different targeting social media platforms can also be compensated based on pre-existing agreements. Users can also get compensated in some embodiments based on number of views, clicks (referral URLs), etc.

In some embodiments, clips 114 may originate from premium content and sources which might create an assumption that the additional content is safe, as in free of intellectual property violations. However, social media platforms can blacklist some companies or partners and such criteria may be used during the additional content selection for a clipped video 110. For example, the system 100 might in one embodiment restrict additional content to content originating from an approved source, such a company or partner that is not blacklisted. With this, Fox Sports or other content providers can show content for some partners during normal viewing on user viewing devices 111 and enable integration of content for a different set of partners in clip 114. The system 100 can integrate into the clipped content 114 support for sponsors of live events (Coca Cola, for example) with supplemental or additional content in clips 114. The matching between additional content and clip 114 can be based on a profile connected with the request to clip the content 110. In one embodiment clip 114 includes metadata to specify protected areas or objects in the content, for example, third party content, so that video editing software will not change those areas.

In one embodiment, after obtaining the clips 114, a user control device 114 may save the clips 114 or share them on a social media platform. Similar to other video, the user control device 112 can edit the video in the app of system 100 before sharing. For example, a user device may add filters, stickers, etc. Saved or shared video clip 114 promotes a content provider's content and allows viewers to share exciting moments from the game. It further allows user devices 112 the ability to capture special formats of video content and share the captured video on social media.

In one embodiment a user control device 112 uses voice control to capture an event 110. A user control device 112 may also use gesture control, detecting the excitement of the viewer or a physical button on the remote control, etc. A user device 112 issues a request to system 100 after receiving a voice command, "I want to share this vaulting performance on TikTok." The request will activate the system 100 to capture a short video clip 114 of the gymnast's vaulting performance, and generate the video 114 according to a template for TikTok. After obtaining the clip 114, the user device 112 can directly upload the clip 114 to TikTok and add a caption describing the performance.

In one embodiment the system 100 captures a clip 114 during an event 110. System 100 receives an instruction to capture a clip 114 of the event, with a length limitation, from a TV remote. The user device 112 saves the clip 114 to its camera roll and sets it as a favorite. The user device 112 also can upload the video to social media and add a caption describing the video 110.

To develop a system that allows user devices to easily capture short video clips 114, it is crucial to address key technical challenges: how to identify the request's intent and how to determine the optimal temporal segment to capture, based on a given trigger signal. For instance, in the three different use cases described above, the intended clips 114 happened at different points relative to the time of the request. Further, in one embodiment, a request can specify one of the three different situations, i.e., a part of the content 110 already passed, is ongoing, or will start soon. The buffering scheme can be changed accordingly. They may use information regarding timing of the intended clip to locate the clip 114 within the buffered content or over all content 110. This timing raises the question of how to identify the best event within the video content 110 that captures the request's intention, while also being limited by time constraints. Therefore, the challenge is to determine the start and end of the optimal video clip 114 to capture, based on the request timestamp, while ensuring that the clip 114 is representative of the desired content. In the situation of using a voice command, parsing of the command will allow the system to know some additional information, and this information will be able to help the automatic decision.

Figure 6A:
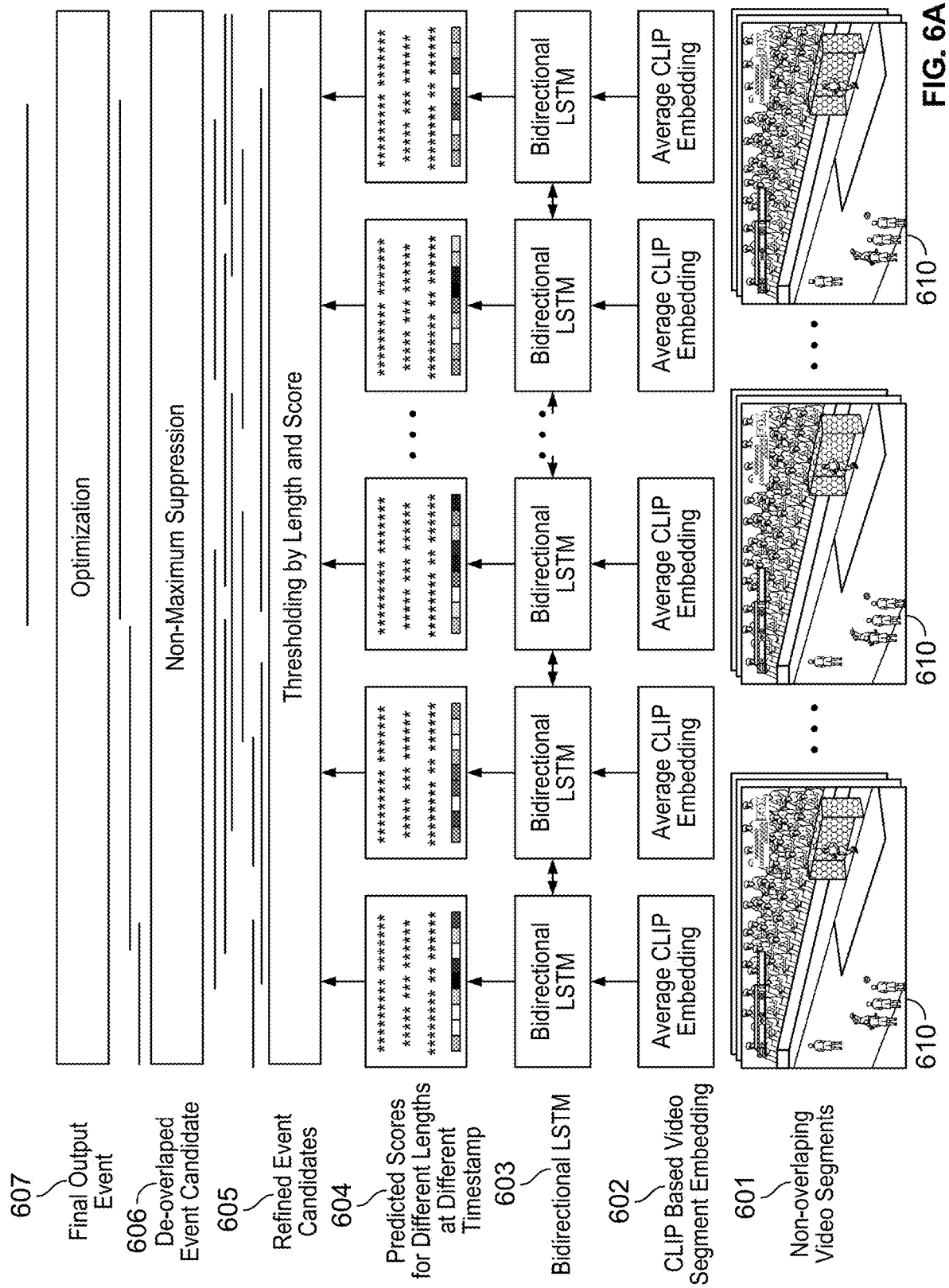
FIG. 6A shows an example technique of determining the start and end timing of a clip of present disclosure.

FIG. 6A shows an example technique of determining the start and end timing of clip 114 given a request and length of request T At the first step 601 the system 100 divides the video of event 110 into a set of non-overlapping segments 610 with a fixed length. For example, the length may be 15 frames, which is half a second for 30 fps (frame per second) video, although other lengths will also be appropriate in some circumstances. In one embodiment, a scene change detection algorithm will be first applied to separate the video content 110 into scenes, and each scene will then be the input to the temporal event extraction algorithm described in FIG. 6A. In one embodiment, the event extraction algorithm will provide a number of proposals, or groupings of segments 610, and the user control device 112 may pick one of them interactively. Offering a proposal for selection may reduce the time required to generate clip 114 because it will provide system 100 with more information regarding where in the event 110 the intended clip 114 is. However, this is not required and the system 100 described is capable of determining and locating intended clip 114 without input beyond the request. For each segment, the system 100 at 602 may compute CLIP embeddings for each frame to determine its contents. The system 100 then average the embedding vectors of all frames in the segment 610 to determine the representation of the segment 610. CLIP model focuses more on the semantic meanings of the image, and is known to have better representation power than the conventional 3D convolutional networks. In one embodiment, the video embedding can be a combination of the 3D-convolution-based features with CLIP-based features. The system 100 can use the representation of segment 610 gathered from the average CLIP embeddings of its frames to establish whether the segment 610 might include clip 114. In particular establishing whether the segment 610 is clip 114 may use a similarity score. At step 603 the system 100 applies a bi-directional Long Short Term Memory (LSTM) sequential model to the sequence of the video segments 610 to predict the scores of how likely a video clip that consists of a variable number of consecutive frames centered at video segment 610, or an event proposal, could be the intended video event of clip 114. At step 604 the system 100 can obtain the score for each potential clip centered at video segment 610 that has lengths starting from 0.5 seconds to a maximum T seconds. In one embodiment the system 100 divides the event proposals with a step size of 1 second, although other lengths may also be appropriate. As an illustration, assuming that different channels or IP owners allow different lengths of video clips 114, and the maximum length T allowed on a particular platform, or otherwise designated, is 20 seconds. Then at each output vector of the bidirectional LSTM node will be a vector that contains 20 different entries, or event proposals, of a different length of video centered at that timestamp, each of which corresponds to a score. After the system 100 obtained the dense event scores of the event proposals, or a score of how likely it is that a proposal tightly contains an event, it may in some embodiments filter the results with a score threshold and a length threshold at step 605. The score threshold could be for example 0.5, and the length threshold may depend on the limit length that is allowed by the particular circumstances. The length threshold might in one embodiment be a range such as segments longer than three seconds but shorter than fifteen seconds.

Next, the resulting clips are de-duplicated at step 606 where a non-maximum suppression algorithm may remove overlapping proposals. From the de-overlapped video event proposals, the system 100 may use an optimization algorithm at step 607 to find out the best proposal for the request. One algorithm that the system may use can be represented as:

$$\hat{p} = \underset{p}{\mathrm{argmax}}(score(p) - \lambda \cdot |t_p - t_0|)$$

where score (p) is the output from the bidirectional LSTM and $|t_p - t_0|$ is the distance from the center of event proposal to the trigger time to.

Figure 6B:
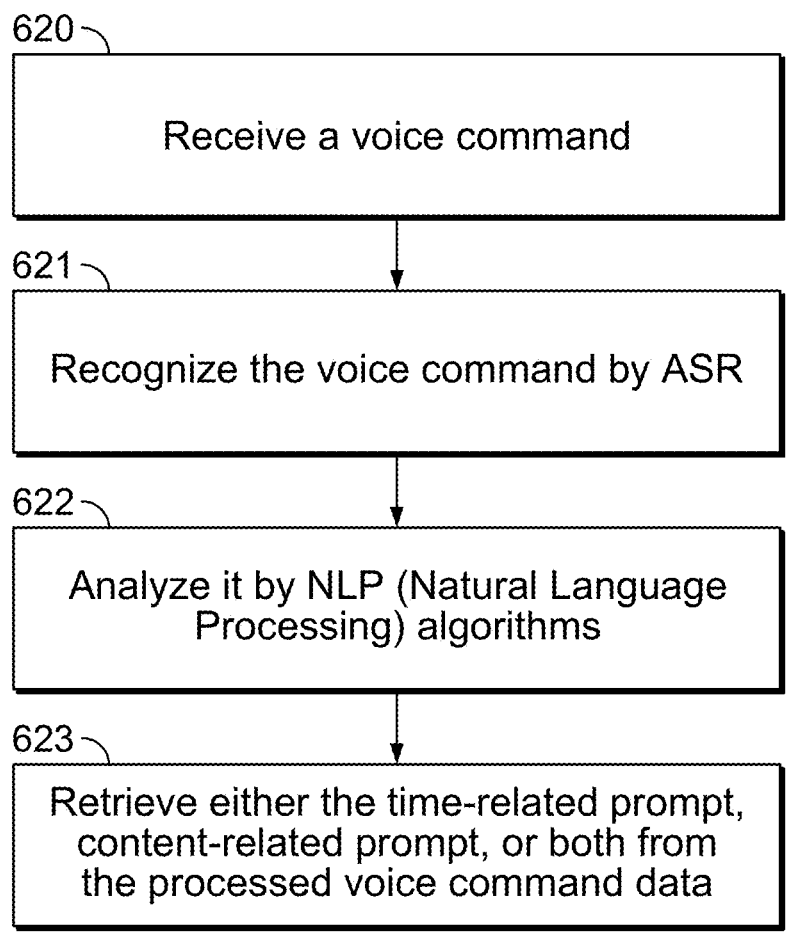
FIG. 6B shows an exemplary process for recognizing a prompt for a clip, in accordance with some embodiments of the disclosure.

As described above, in one embodiment, the user control device 112 can trigger the process according to a voice command. FIG. 6B illustrates an example of this embodiment. In one embodiment the user control device 112 includes a microphone for collecting voice input. Use control device 112 may further include voice detection and processing software that enables it to receive such a voice command similar to that described above. The process begins at step 620 when the system 100 may receive a voice command from user control device 112 or other hardware. Next at 621 it may recognize this voice command by ASR and at step 622 analyze it by NLP (Natural Language Processing) algorithms. In one embodiment user control device 112 analyzes the voice command to extract a request and sends a result for templates and other data to system 100 as seen in FIG. 2. After processing, at step 623 the system 100 may retrieve either the time-related prompt, content-related prompt, or both from the processed voice command data. For a time-related prompt, for example, if the voice command indicates the target of the request has already passed, the system may only consider the input video time of buffered content interval from 0 to T/2. A voice command request that indicates the clip 114 has already happened may be for example, "send me a clip of that goal," "clip that song," "send me the last play," or "clip that comment I just heard." In such an embodiment the system 100 may determine the clip 114 based on the timing of the request and the events of content 110 relative to the time of the request. For example the system 100 might determine that the request "clip that goal!" most likely refers to the most recent goal that was scored. Time-related prompts may also in some embodiments take other forms such as a text prompt or voice prompts In one embodiment the system 100 may simply extract the event recognized as the subject of the prompt for processing and automatic upload (e.g., post to the preferred social network or platform). In some embodiments time-related prompts allow the system 100 to retrieve the content from a buffer (e.g., live TV buffer on a server that is normally used to allow user to pause and control live TV). More specifically, a command such has "clip the goal" might result in retrieving the segment(s) that depict the most recent goals that occurred near the time period in which the command was issued, from the live TV buffer for processing automatic uploading or posting to a social network, or sending to the user control device 112. Similarly, the system 100 may also consider the input time from T/2 to T if the prompt indicates the target event is about to happen. A voice command request that indicates the clip 114 is about to happen may be for example, "clip the next minute," "send me a clip of this pass," "send the next goal," or "send me a clip of this player." The system 100 can also use a time-related prompt before the thresholding step to remove all the candidate events that are not consistent with the time-related prompt. For a content-related prompt, the system 100 can compute the content score, which is the cosine similarity between two embeddings. It should be noted that in some embodiments the command is not a voice command but a text command or other medium. In those embodiments the system 100 also receives similar prompts and the process described in FIG. 6B may be followed with appropriate modifications to steps 620, 621, 622, and 623 to extract the prompt using alternative algorithms.

The system 100 may keep a log or track of main events that occurred in order to allow users to query and clip past events. This allows requests later in the content item 110 for events that occurred at the beginning of a show or a game.

Figure 7:
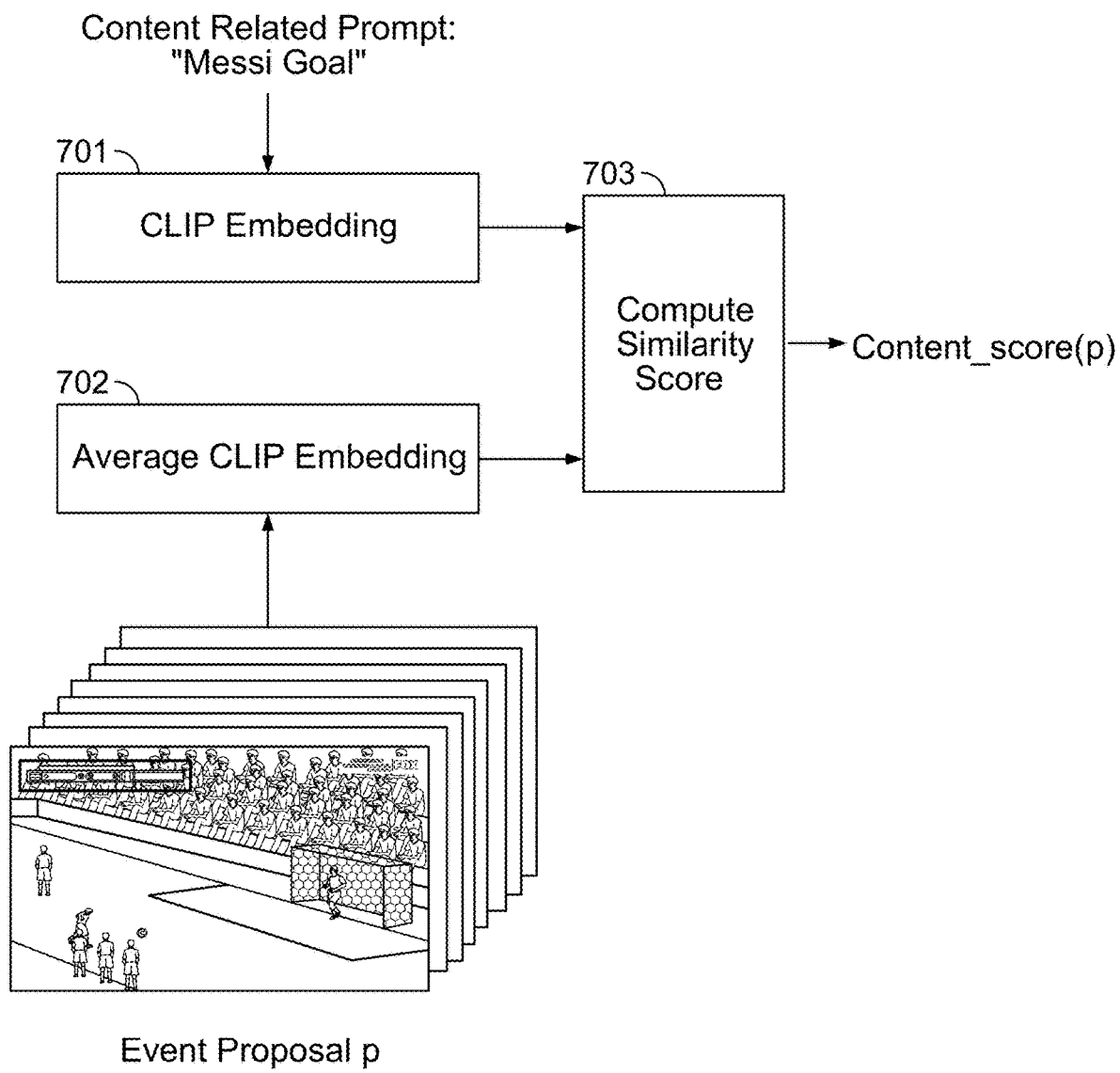
FIG. 7 shows an example technique of determining a similarity score of the present disclosure.

As shown in FIG. 7, the system 100 creates a CLIP embedding 701 of a content related prompt, such as the prompt "Messi goal." The system 100 can next analyze a series of segments 610 which collectively form a proposed event to get a CLIP embedding of each segment 610. The system may then in 702 determine an average CLIP embedding of the proposed event by determining an average CLIP embedding of the segments 610 of the proposed event. The system 100 next computes a similarity score 703 that indicates whether the proposed event has the same subject as the intended clip 114 using the CLIP embeddings 701 and 702. The score 703 can be calculated based on embeddings 701 and 702 for example using an algorithm as described below:

$$\text{Content\_score}(p) = \text{Content\_score}(F_p, F_t) = \frac{F_p \cdot F_t}{\|F_p\| \|F_t\|}$$

where the average CLIP embeddings 702 of the frames in each event proposal is $F_p$ and the other is the CLIP embedding of the content-related prompt is $F_r$. The system 100 may use this content score 703 to remove the event candidates with lower scores in a thresholding step. Finally, in an optimization step, in some embodiments the system 100 may add one more term to the cost function for the remaining event proposals:

$$|\hat{p} = \underset{p}{\operatorname{argmax}}(score(p) + \lambda_1 \cdot \text{content\_score}(p) - \lambda_2 \cdot |t_p - t_0|)$$

In some embodiments, if the aspect ratio of the input video is different from the aspect ratio specified in the template for the video content, the clip 114 may need spatial cropping, in additional to temporal cropping. Spatial cropping may also optimize the clip 114 in situations using a zoom function to highlight an action or make the action easier to see. The system 100 in some embodiments uses center crop, i.e., in each frame, the system 100 crops the center portion of the given aspect ratio, with one side the same as the original video 110. However, this static center cropping may create issues if the intended event moves out of the cropping region. In such a situation the clip 114 may unintentionally omit or partially omit the intended event or action, defeating the purpose of the clip 114. One example of such cropping is shown in FIG. 8. In that FIG., a request intends for the circled individual 804 to be highlighted in the clip 114. However, as seen in image 802, an example of center cropping of original image 801, center cropping of 801 will result in unnecessary removal of the intended content since the circled individual 804 is absent in 802. In such situations, adaptive cropping may be a better option. An illustration of adaptive cropping can be found in image 803 which is an example of adaptive cropping of image 801. In 803, the circled individual 804 remains, as is seen in the FIG. Further, in both results 802 and 803, the scoreboard 805, inside the rectangle, is cropped in the middle. The system 100 can use known algorithms to remove the scoreboard 805 and logo before cropping. For example an algorithm may recognize the scoreboard 805 as a known entity, and in some embodiments with a known location, and process the image of the scoreboard 805 and an output clip 114 to always include the scoreboard 805 or a majority of the scoreboard 805.

The system 100 may also in some embodiments add or remove features as part of the cropping process. In one example cropping process, the system 100 first removes graphic overlays such a scoreboard or logo from an original image or video 110, such as image 801. The system 100 may next obtain the caption of the video, or clip 114. The request or CLIP embeddings may inform the caption. The system 100 may use artificial intelligence to caption the video clip 114 or may receive a caption, such as from user control device 112. For example a user control device may provide instructions to add a comment "Watch this goal!" under clip 803 in the example shown in FIG. 8. The caption may also be for example "Messi goal" where Messi is the circled character. The system 100 may then use the obtained description to find the caption-guided saliency map Sal(t) for each frame, where t is the timestamp of the frame.

When cropping from one aspect ratio to another aspect ratio, the system 100 may use a pan to follow the action along a curve. The trajectory of the center of the pan might be equivalent a curve c=f(t), where c is the coordinate of the center, and t is a point in time of the clip. In order to have a smooth motion, that is the pan follows a straight line, the center might have a linear motion, thus c=f(t)=a·t+b. In some embodiments, since the motion cannot be too severe, a constrain a<Th_a might limit the slope to less than a predefined threshold Th_a. This limitation might ensure small motions that feel expected and natural rather than large motions which can feel choppy and be difficult to follow.

We further formulate the problem of finding the parameters a and b as an optimization problem $$\hat{a}, \hat{b} = \underset{\substack{a,b \\ s.t. \ a<y h, a}}{\operatorname{argmax}} \left( \sum_t \sum_{x,y \in crop(a \cdot t + b)} Sal(t, x, y) \right)$$

where crop(a·t+b) is the cropped region with crop center c=a·t+b, and Sal(t, x, y) is the value of the saliency map at coordinate (x, y).

To efficiently solve this optimization problem, a Hough transform can be applied. First, the parameters a and b will be discretized and each possible pair of a and b will be voted by all the saliency values of each pixel in the video.

Figure 9:
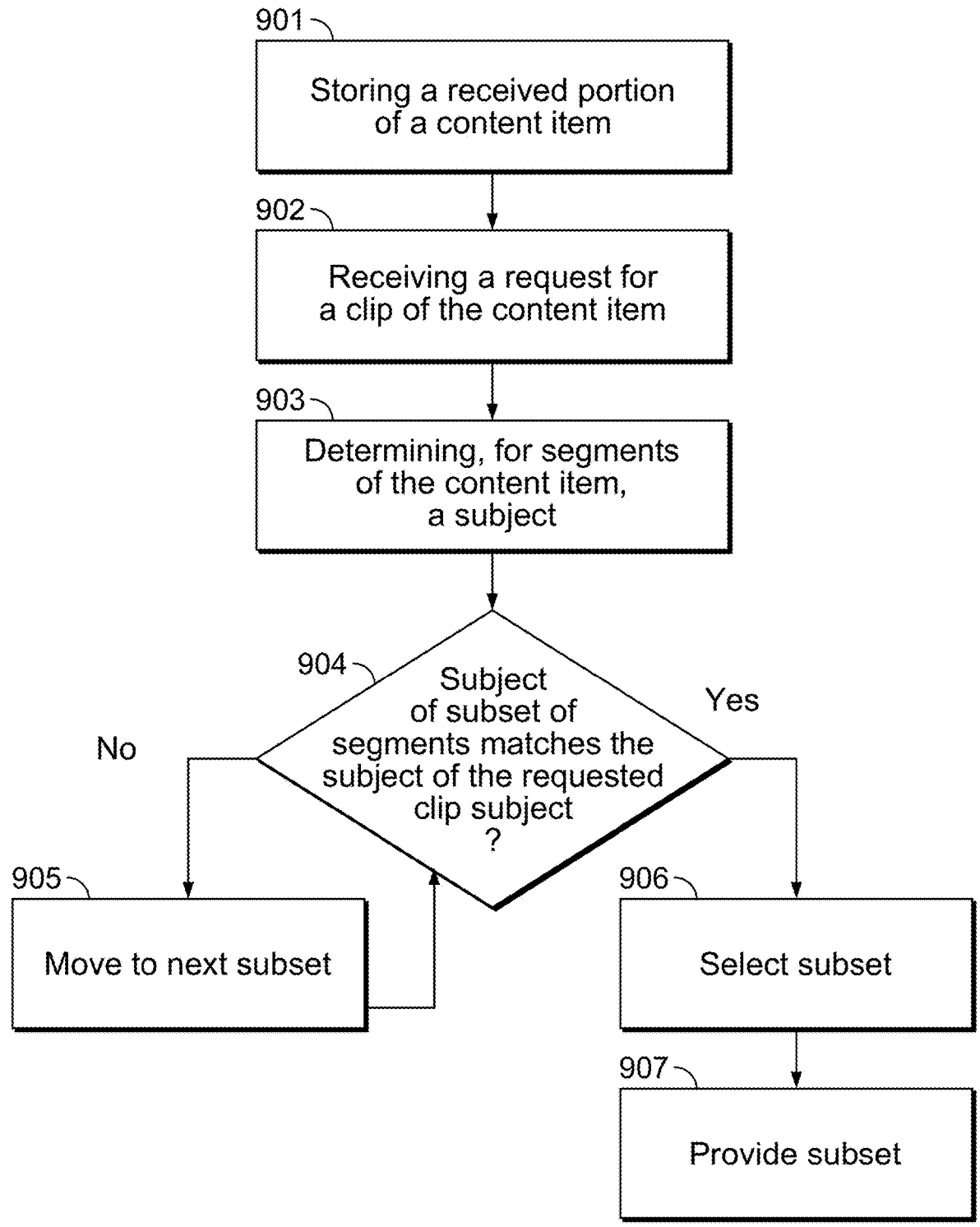
FIG. 9 shows an example method of the present disclosure.

FIG. 9 illustrates an example method of the present disclosure. At step 901 the method stores in a buffer a received portion of a content item 100 comprising a plurality of sequential segments 610. In one embodiment the buffer is part of memory 151 on user viewing device 111, that is, a viewing device such as a television or smartphone stores portions of the content during display. At step 902 the method receives, via a user interface 162 on user control device 112, a request for a clip 114 of the content item 110, the request associated with a clip subject. The request may be in text or voice form as described above or any other form that might convey an intended clip 114. At step 903 the method, using processor 170 on for example server 200, determines, for each segment 610 of the plurality of sequential segments, a subject of the respective segment. At step 904 the method determines using processor 170 whether a subset of the plurality of sequential segments based on the subject of each segment 610 in the subset of the plurality of sequential segments matches the clip 114 subject associated with the request. The number of the subset may have a duration no larger than a predetermined time frame to ensure that the generated clip meets any requirements for a given platform or preference. In one embodiment a content provider, such as a broadcaster, network, or service, determines the predetermined time frame. If the subject of the subset and intended clip 114 do not match, the method moves to 905 where a new subset of the plurality of sequential segments is selected and the method returns to step 904. If the subjects do match at step 904, the method provides the selected subset of consecutive segments at step 906. This subset becomes clip 114 and the system 100 transmits the clip 114 to user control device 112 for use including downloading or sharing.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
   storing in a buffer a received portion of a content item comprising a plurality of sequential segments;
   receiving, via a user interface, a request for a clip of the content item, the request comprising a clip subject;
   determining, for each segment of the plurality of sequential segments, based on one or more embedding vectors calculated for the respective segment, a non-visual representation of the respective segment comprising semantic meanings of one or more frames of the respective segment;
   determining, for each segment of the plurality of sequential segments, a corresponding similarity score between the clip subject and the representation of the respective segment;
   selecting a subset of the plurality of sequential segments based on the corresponding similarity score for each segment in the subset of the plurality of sequential segments meeting or exceeding a threshold, wherein the subset has a duration no larger than a predetermined time frame; and
   providing the subset of the plurality of sequential segments.

2. The method of claim 1, further comprising:
   accessing an indication of a platform on which to display the requested clip; and
   modifying a format of the subset of the plurality of sequential segments for display on the platform.

3. The method of claim 2, wherein the indication comprises a selection.

4. The method of claim 2, wherein modifying the format comprises
   obtaining a caption describing the subset of the plurality of sequential segments;
   determining a caption-guided saliency of each frame of the subset of the plurality of sequential segments based on the caption; and
   determining, using the determined caption-guiding saliencies, a center trajectory of the subset of the plurality of sequential segments.

5. The method of claim 1, wherein the request for a clip is voice activated.

6. The method of claim 1, further comprising automatically providing additional content after providing the subset of the plurality of sequential segments.

7. The method of claim 6, wherein the additional content originates from an approved source.

8. The method of claim 2, wherein modifying the format includes providing spatial area for additional content for concurrent display with the subset of the plurality of sequential segments.

9. The method of claim 2, wherein modifying the format is based on a user profile.

10. The method of claim 1, wherein a content owner of the content item provides the predetermined time frame.

11. A system comprising:
    processing circuitry configured to:
       store in a buffer a received portion of a content item comprising a plurality of sequential segments;
       receive, via a user interface, a request for a clip of the content item, the request comprising a clip subject;
       determine, for each segment of the plurality of sequential segments, based on one or more embedding vectors calculated for the respective segment, a non-visual representation of the respective segment comprising semantic meanings of one or more frames of the respective segment;
       determine, for each segment of the plurality of sequential segments, a corresponding similarity score between the clip subject and the representation of the respective segment;
       select a subset of the plurality of sequential segments based on the corresponding similarity score for each segment in the subset of the plurality of sequential segments meeting or exceeding a threshold, wherein the subset has a duration no larger than a predetermined time frame; and
       provide the subset of the plurality of sequential segments.

12. The system of claim 11, wherein the processing circuitry is further configured to:
    access an indication of a platform on which to display the requested clip; and
    modify a format of the subset of the plurality of sequential segments for display on the platform.

13. The system, of claim 12, wherein the indication comprises a selection.

14. The system of claim 12, the processing circuitry further configured to, when modifying the format:
    obtain a caption describing the subset of the plurality of sequential segments;
    determine a caption-guided saliency of each frame of the subset of the plurality of sequential segments based on the caption; and
    determine, using the determined caption-guiding saliencies, a center trajectory of the subset of the plurality of sequential segments.

15. The system of claim 11, wherein the request for a clip is voice activated.

16. The system of claim 11, wherein the processing circuitry is further configured to automatically provide additional content after providing the subset of the plurality of sequential segments.

17. The system of claim 16, wherein the additional content originates from an approved source.

18. The system of claim 12, the processing circuitry further configured to, when modifying the format, provide spatial area for additional content for concurrent display with the subset of the plurality of sequential segments.

19. The system of claim 12, wherein to modify the format is based on a user profile.

20. The system of claim 11, wherein a content owner of the content item provides the predetermined time frame.

* * * * *